US006195675B1

United States Patent
Wang et al.

(10) Patent No.: US 6,195,675 B1
(45) Date of Patent: Feb. 27, 2001

(54) TONE DETECTION USING DISCRETE FOURIER TRANSFORM TECHNIQUES

(75) Inventors: Rui Wang; Wen Tong, both of Ottawa (CA)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 09/069,801

(22) Filed: Apr. 30, 1998

(30) Foreign Application Priority Data

Dec. 19, 1997 (CA) .................................................. 2222231

(51) Int. Cl.[7] .................................................. G06F 17/14
(52) U.S. Cl. .......................................... 708/405; 708/312
(58) Field of Search ..................................... 708/405, 404, 708/312

(56) References Cited

U.S. PATENT DOCUMENTS

| 4,106,103 | * | 8/1978 | Perreault | 708/405 |
| 4,698,769 | | 10/1987 | McPherson et al. | 364/724 |
| 4,742,534 | * | 5/1988 | Verbeek et al. | 708/405 |
| 4,868,776 | * | 9/1989 | Gray et al. | 708/405 |
| 4,929,954 | * | 5/1990 | Elleaume | 708/405 |
| 5,119,322 | * | 6/1992 | Stroobach | 708/405 |
| 5,371,696 | | 12/1994 | Sundararajan et al. | 364/726 |

OTHER PUBLICATIONS

"Subband DFT—Interpretation, Accuracy, and Computational Complexity", O.V. Shentov et al., Proc. of the Asilomar Conference on Signals, Systems and Computers, vol. 1, No. CONF.25, XP000312709, pp. 95–100, Nov. 4, 1991.

* cited by examiner

Primary Examiner—David H. Malzahn

(57) ABSTRACT

Supervisory audio tone (SAT) in a receive signal in a wireless communications system is detected using a discrete Fourier transform (DFT) supplied with samples of a filtered and decimated signal derived from the receive signal. The DFT can comprise M 2-input butterfly computation stages for computing an N-point DFT where $N=2^M$. Each of the stages m from 1 to M−1 determines and stores, for each current sample at the input, at most $2^m$ intermediate results forming only a subset of intermediate results required for computation by the next stage. Each of up to $2^m$ other intermediate results required for computation by the next stage is produced by shifting of a respective stored intermediate result of the respective subset determined in respect of an input sample preceding the current sample by $2^{M-m-1}$ samples. For example there are M=5 stages for a 32-point DFT having 18 outputs, 6 outputs for each of three SAT frequencies.

38 Claims, 4 Drawing Sheets

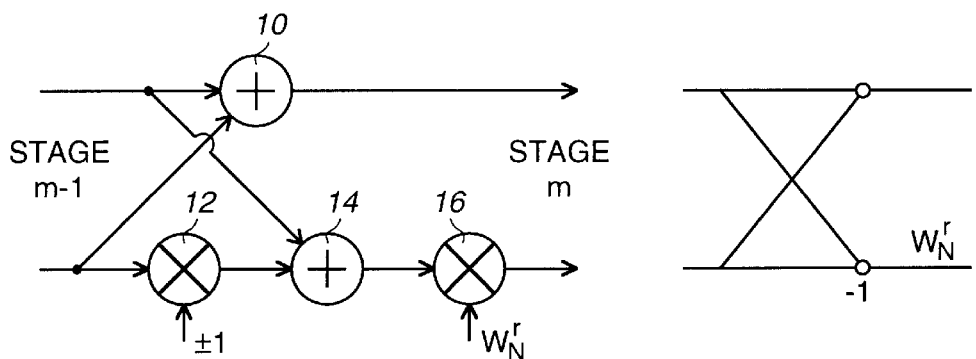
Fig. 1A   PRIOR ART
Fig. 1B   PRIOR ART
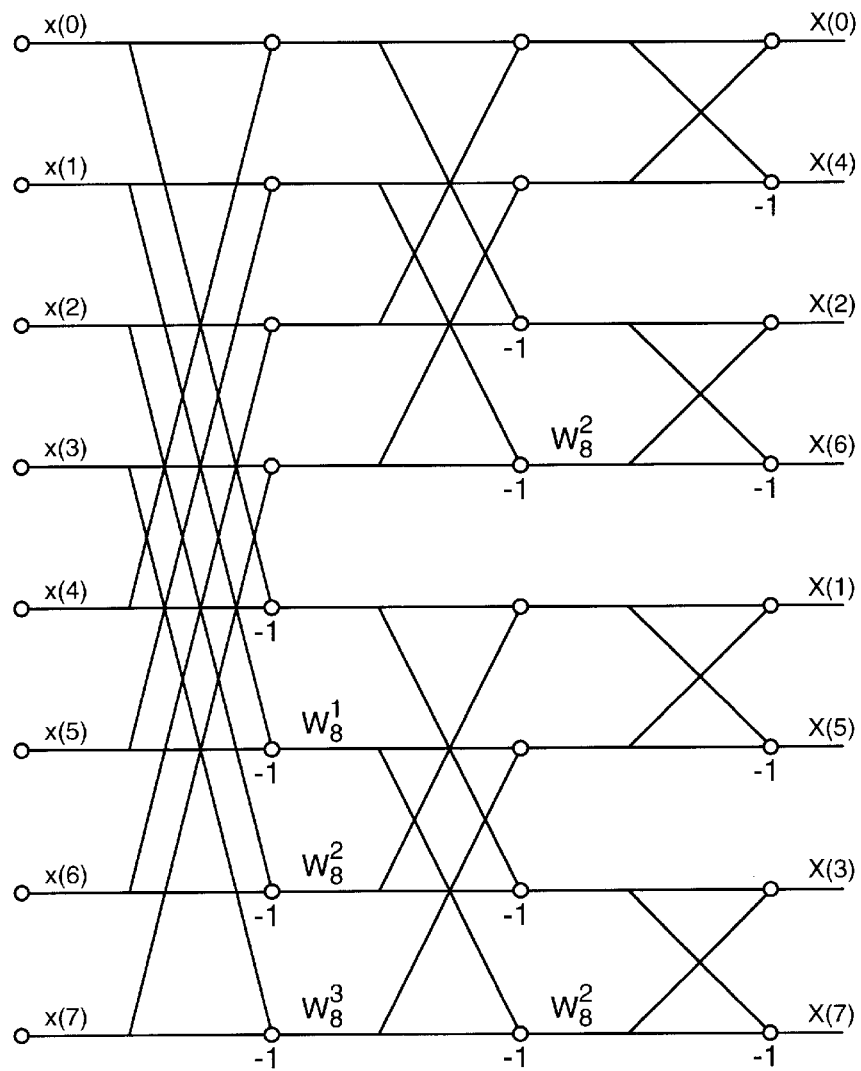
Fig. 2   PRIOR ART

TONE DETECTION USING DISCRETE FOURIER TRANSFORM TECHNIQUES

This invention relates to tone detection using discrete Fourier transform (DFT) techniques. The invention is particularly concerned with detection of a supervisory audio tone (SAT) in wireless communications systems such as AMPS (Advanced Mobile Phone System).

BACKGROUND OF THE INVENTION

In a wireless communications system such as AMPS, FM (frequency modulation) is used for communicating voice signals together with a supervisory audio tone (SAT) which is transmitted by a base station with a nominal frequency selected from three possible nominal frequencies of 5970, 6000, and 6030 Hz, and an FM deviation of ±2 kHz±10%. SAT components of the signal transmitted by the base station are transponded by a mobile terminal back to the base station using a phase locked loop (PLL). The base station is required to detect the presence and loss of SAT within attack and release times, respectively, of 200 ms. The SAT is required to be present all the time for the voice channel, and voice calls can be interrupted if a valid SAT is not detected. Accordingly, reliable SAT detection is important for proper operation of the system.

In practice, reliability of SAT detection can be of concern in situations where there is a low C/I (signal carrier to interference) ratio, for example under co-channel interference (CCI) conditions, and situations where the mobile terminal may not fully comply with specifications. For example, in fading and shadowing conditions, the PLL in the mobile terminal may not be able to track well, so that the transponded SAT can drift in frequency. In addition, the FM deviation of the transponded SAT frequency may be different from the specified ±2 kHz±10%, also adversely affecting SAT detection by the base station.

A digital PLL can be used to detect a sinusoidal signal, but is not well suited to SAT detection because it requires a relatively long capture time and does not work well in the fading channel environment of wireless communications systems. A matched filter or coherent detection technique can be used, but this only works well with SAT frequencies that are very accurate. The SAT detection performance of matched filters is seriously degraded for small frequency differences for example of 3 Hz, so that matched filters can not be used for detecting SAT from out-of-specification mobile terminals. Auto-correlation based SAT detectors have been used because they are not sensitive to SAT frequency variation, but they do not provide an optimal SAT detection.

McPherson et al. U.S. Pat. No. 4,698,769, issued Oct. 6, 1987 and entitled "Supervisory Audio Tone Detection In A Radio Channel", describes a base station SAT detector in which a DFT is applied to complex numbers derived by accumulation from samples of the received signal, and the powers at the SAT frequencies are compared with threshold levels to determine whether or not the respective SAT is present in the received signal. This patent describes the use of an 8-point DFT with an approximation used to simplify the calculations, but in practice a larger and more accurate DFT is required to provide a desired frequency resolution for SAT detection. Typically, a 32-point DFT may be desired. The resources required for computing a 32-point DFT are considerably greater than those required for computing an 8-point DFT.

Block computation of a 32-point DFT in known manner also creates a high peak digital signal processing (DSP) load for computing the DFT periodically, with relatively low DSP loads at other times. In practice in a base station of a wireless communications system it is desirable to avoid such high peak DSP loads.

Accordingly, an object of this invention is to provide an improved method of and apparatus for DFT computation for tone detection, particularly for detecting SAT in a wireless communications system.

SUMMARY OF THE INVENTION

One aspect of this invention provides a method of determining at least one frequency component of a sampled input signal using an N-point DFT, where $N=2^M$ and M is an integer greater than 1, the DFT comprising M stages of butterfly computations from at least one input for the successive samples of the input signal to a respective output for each frequency component, comprising the steps of: providing each of said stages with up to $2^{m-1}$ butterfly computations where m is a number of the stage from 1 to M from said at least one input to said respective output(s); determining said at least one frequency component at its respective output from the stage M; and for each of the stages from 1 to M-1: determining 1 to $2^m$ intermediate results using the respective butterfly computation(s) and storing the determined intermediate result(s); and deriving 1 to $2^m$ intermediate results required, in addition to the 1 to $2^m$ intermediate results determined in respect of a current sample of the input signal, for butterfly computation(s) in the next subsequent stage from the stored intermediate result(s) determined in respect of preceding sample(s) of the input signal.

Another aspect of this invention provides a method of computing at least one output of a discrete Fourier transform (DFT) from input signal samples using a digital signal processor (DSP) providing a plurality of computation stages and storage locations for storing intermediate results between the stages, comprising the steps of: for at least one of the stages, determining only a subset of the intermediate results required for computation by the next stage; storing the determined subset of intermediate results in respective ones of said storage locations; and producing each other intermediate result required for computation by the next stage by shifting relative to the storage locations a respective stored intermediate result of said subset determined in respect of a preceding input signal sample.

Preferably each of the stages comprises a butterfly computation stage having two inputs and at least one output. Conveniently the DFT is an N-point DFT where $N=2^M$ and M is an integer greater than 1, there are M stages, each of the stages m from 1 to M-1 determines at most $2^m$ intermediate results in the respective subset for a current input signal sample, and each of up to $2^m$ other intermediate results required for computation by the next stage is produced by said shifting of a respective stored intermediate result of the respective subset determined in respect of an input signal sample preceding the current input signal sample by $2^{M-m-1}$ samples. The method is used to advantage for computing at least $\log_2(N)$ outputs of the DFT, and can be used for computing N outputs of the DFT.

The invention also provides a method of detecting at least one predetermined frequency component in a signal, comprising the steps of computing, for each predetermined frequency component, at least one respective output corresponding to said frequency component of a DFT by the method recited above, samples of said signal being supplied as the input signal samples to the DFT, and detecting presence or absence of the predetermined frequency component from the respective output of the DFT.

A further aspect of the invention provides a method of detecting a frequency component in a signal, comprising the steps of: supplying samples of the signal to at least one input of a discrete Fourier transform (DFT) having at least one output corresponding to said frequency component; and monitoring a signal at said at least one output of the DFT to detect said frequency component in the signal; the DFT comprising a plurality of sequential computation stages between said at least one input and said at least one output of the DFT, and storage locations for storing intermediate results between successive stages; wherein the DFT computes the signal at said at least one output using intermediate results, for at least one of the computation stages, which are a combination of intermediate results determined in respect of a current sample of the input signal and intermediate results which have been stored in the storage locations and have been determined in respect of a previous sample of the input signal. Preferably the signal at said at least one output is determined for each sample of the input signal, i.e. sample by sample of the input signal.

Yet another aspect of this invention provides a method of monitoring supervisory audio tone (SAT) in a received signal of a communications system, comprising the steps of: deriving from the received signal a sequence of samples and supplying the samples to a discrete Fourier transform (DFT) unit comprising a plurality of successive computation stages and storage locations between the stages for storing intermediate results determined by one stage for use by the next stage; for each sample supplied to the DFT unit, producing in said storage locations intermediate results which are a combination of intermediate results determined in respect of the current sample and intermediate results determined in respect of at least one preceding sample and stored in respective ones of said storage locations; the DFT unit producing signals at respective outputs thereof corresponding to a plurality of SAT frequencies of the system; and monitoring the signals produced at said outputs of the DFT unit to determine the presence of SAT in the received signal at a respective SAT frequency.

In embodiments of this method described below, the DFT unit computes an N-point DFT and provides n outputs corresponding to said frequency decision range, where N and n are integers and n<N, wherein said bandwidth corresponds to approximately N/n times said frequency decision range. Preferably $N=2^m$ where m is an integer greater than 1, and typically n is greater than $\log_2(N)$. In a preferred embodiment described below, N=32 and n=18.

The invention also provides a digital signal processor programmed and arranged to carry out any of the methods recited above.

Furthermore, the invention provides a discrete Fourier transform (DFT) unit comprising: an input for successive samples of a sampled signal and at least one output corresponding to a frequency component of said signal; a plurality of successive butterfly computation stages between said at least one input and said at least one output, and storage locations for storing intermediate results between the stages, at least one of the stages being arranged to compute and provide to respective storage locations in respect of a current sample at said input only a subset of the intermediate results required by the respective next successive stage for computation in respect of the current sample at said input; and means for producing each other intermediate result, required by the respective next successive stage for computation in respect of the current sample at said input, by shifting relative to the storage locations a respective stored intermediate result of said subset computed in respect of a sample at said input preceding the current sample.

The invention further provides apparatus for detecting a tone in a received signal of a communications system, comprising a DFT unit as recited above in which the at least one output corresponds to a frequency of the tone, means for supplying to the input of the DFT samples of a signal derived from the received signal, and means for monitoring a signal produced at said at least one output to detect said tone.

BRIEF DESCRIPTION OF THE DRAWINGS

The invention will be further understood from the following description with reference to the accompanying drawings, in which:

FIG. 1A illustrates a known so-called butterfly computation block for use in computing a DFT;

FIG. 1B is a flow graph of the butterfly computation of FIG. 1A;

FIG. 2 is a flow graph for computing an 8-point DFT in known manner;

DETAILED DESCRIPTION

Figure 3:
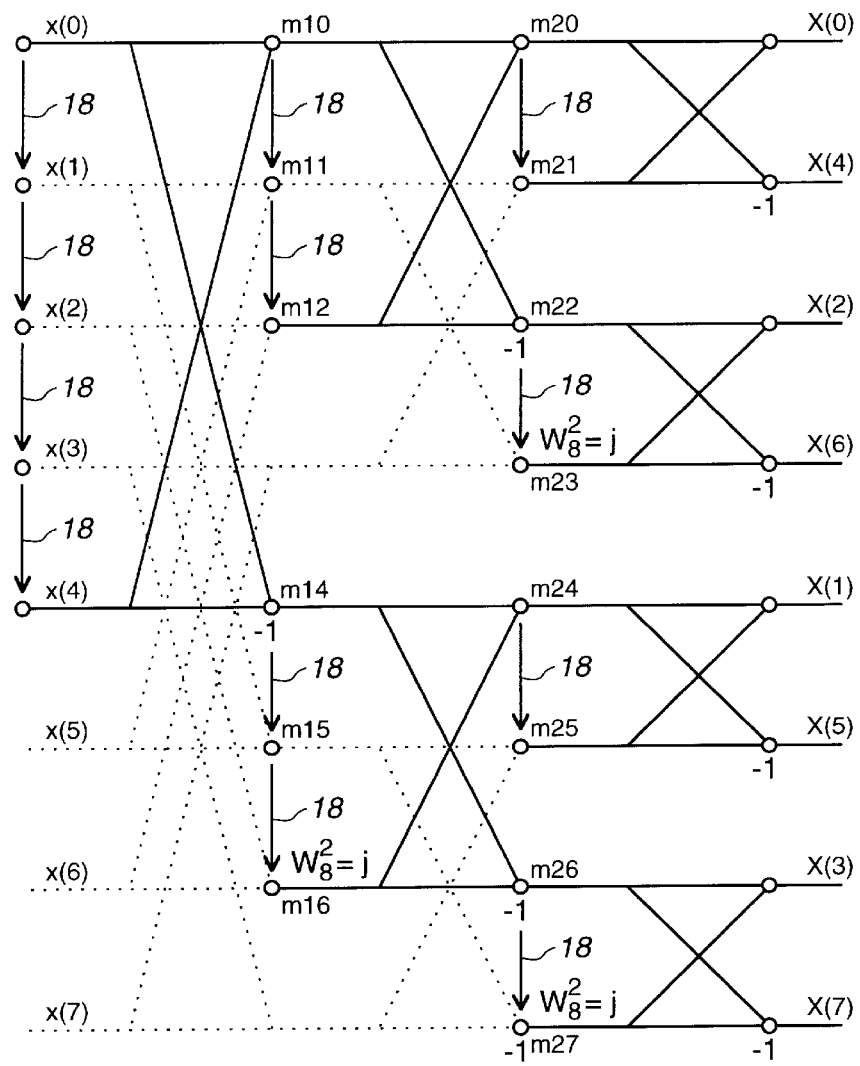
FIG. 3 is a flow graph for computing an 8-point DFT in accordance with an embodiment of this invention.

It is well known that the computation of a DFT can be subdivided into stages of smaller DFT computations, and that this subdivision can be repeated successively. The subdivision can be on the basis of the input sequence, in which case it is referred to as decimation-in-time, or on the basis of the output sequence, in which case it is referred to as decimation-in-frequency. In either case, conveniently the size N of the DFT is an integer M power of two, i.e. $N=2^M$. This enables computation of the N-point DFT to be subdivided into M stages each having N/2 so-called butterfly computations each having two complex signal inputs and two complex signal outputs. For convenience throughout the following description, the term "complex signal" is abbreviated to "complex". The following description relates to decimation-in-frequency computation arrangements, and it should be appreciated that computation arrangements based on decimation-in-time can correspondingly be provided.

FIG. 1A illustrates a general form of a butterfly computation block which comprises complex adders 10 and 14 and multipliers 12 and 16. The adder 10 adds the two complex inputs of the computation block, constituted by outputs of the previous stage m−1 (or samples of the input sequence for the first stage for which m=1), to produce one complex output of the computation block. The second output of the computation block is produced by multiplying one of the two complex inputs by 1 or −1 in the multiplier 12, adding the result to the other complex input in the complex adder 14, and multiplying the output of the adder 14 in the complex multiplier 16 by a complex number $W_N^r = e^{j2\pi r/N}$, where r is an integer index.

In many instances of the butterfly computation block in a DFT computation, the index r=0 so that $W_N^r=1$ and the complex multiplier 16 is omitted. The multiplication by 1 or −1 by the multiplier 12 can be implemented at the input of the complex adder 14, so that a separate multiplication is not required. Although the butterfly computation block is described here in terms of physical multipliers and adders, it can be appreciated that usually the respective multiplications and additions will be constituted by operations of a digital signal processor (DSP) on values stored in memory and representing the complex signals.

FIG. 1B is a flow graph illustration of the butterfly computation block of FIG. 1A, such flow graph illustrations being used below for simplicity as is usual in the DFT field. In subsequent flow graphs the designation $W_N^r$ is provided as illustrated in FIG. 1B, with appropriate numbers for r and N for the index and DFT size respectively, only where this multiplier is not equal to 1. Likewise in subsequent flow graphs the designation −1 is provided as illustrated in FIG. 1B only where the multiplication 12 is −1 rather than 1. The circles in the flow graph illustration represent locations in memory for storing the respective complex signals at these points.

FIG. 2 illustrates by way of example a flow graph for computing an 8-point DFT in known manner. In this case N=8 so that there are M=3 stages each of which comprises four butterfly computations as illustrated. The first stage operates on samples x(0) to x(7) of a complex input sequence, and the third stage produces complex outputs X(0) to X(7) (in a different order as illustrated) representing respective frequency bin components of the input sequence. Implementation of the DFT requires 5 complex multiplications as shown by respective designations of the form $W_N^r$, and 24 complex additions.

In an implementation in a DSP of the DFT computing unit represented by FIG. 2, the N=8 complex inputs would be stored in respective memory locations in a random access memory (RAM) as represented in FIG. 2 by circles at the inputs, and the N=8 complex outputs of each of the M=3 stages would also be stored in respective memory locations in RAM. For computation of the DFT in this manner, it is possible for the same memory locations to be re-used, the contents of the memory locations being successively overwritten with the complex outputs of the first, second, and third of the M=3 stages.

FIG. 3 illustrates in solid lines a flow graph for computing an 8-point DFT in accordance with an embodiment of this invention. Dotted lines are also shown in FIG. 3 to assist in comparing this flow graph with that of FIG. 2. In FIG. 3, vertical downwardly-directed arrows 18 represent a shifting of stored values in memory locations in RAM, as described further below, or a corresponding adjustment of addresses used for accessing the stored values. Consequently, in a DSP implementation of the flow graph of FIG. 3 memory locations can not be re-used in the same manner as for the flow graph of FIG. 2. However, the flow graph of FIG. 3 provides a substantial reduction in processing required for computing the DFT, which can constitute a substantial advantage.

The flow graph of FIG. 3 computes the DFT for each sample of the input sequence supplied to it; the input sequence is decimated as described further below to provide an appropriate rate of updating the DFT computations. As a result, the processing load is distributed over time much more evenly than with block computation of the DFT, and high peak processing loads are substantially avoided.

For convenience, intermediate result memory locations, represented in FIG. 3 by circles, are referenced m10 to m12 and m14 to m16 for complex results at the output side (at the outputs of the complex additions) of the first stage, and m20 to m27 for complex results at the output side of the second stage.

In a DFT computation in accordance with the flow graph of FIG. 3, complex samples of the input sequence are successively supplied as the input samples x(0). With each successive sample of the input sequence, there is an effective shifting of the samples of the input sequence and of intermediate results of the DFT computation as shown by the arrows 18 in FIG. 3. Thus in the input sequence, the sample x(3) becomes a new sample x(4), the sample x(2) becomes a new sample x(3), the sample x(1) becomes a new sample x(2), the sample x(0) becomes a new sample x(1), and a current new sample becomes the sample x(0). At the output side of the first stage, the intermediate result at location m11 becomes a new intermediate result at location m12, the intermediate result at location m10 becomes a new intermediate result at location m11, and a new intermediate result at location m10 is calculated from the samples x(0) and x(4) as shown by the stage 1 butterfly computation illustrated in solid lines in FIG. 3. Similarly, the intermediate results at locations m15 and m14 become new intermediate results at locations m16 and m15 respectively, and a new intermediate result at location m14 is calculated from the samples x(0) and x(4) as shown by the other output of the stage 1 butterfly computation illustrated in solid lines in FIG. 3.

Likewise, at the output side of the second stage, the intermediate results at locations m26, m24, m22, and m20 become new intermediate results at locations m27, m25, m23, and m21 respectively, and new intermediate results are calculated, from the updated intermediate results at the output side of stage 1 at locations m10 to m12 and m14 to m16, in accordance with the second stage butterfly computations shown in solid lines in FIG. 3, for locations m20, m22, m24, and m26. The output complex values X(0) to X(7) are calculated from the updated intermediate results at locations m20 to m27 in accordance with the third stage butterfly computations shown in FIG. 3.

As indicated above, the updating of the input sequence samples and intermediate results as represented by the arrows 18 in FIG. 3 can be achieved by changing pointers to or addresses of the respective memory locations or by moving the samples and intermediate results between memory locations in the manner of a shift register. For convenience this is referred to below as a shifting of the samples or intermediate results, but it should be understood that the complex values themselves are not necessarily shifted.

It can be seen from the flow graph of FIG. 3 that only 3 complex multiplications are required, compared with the 5 complex multiplications in the flow graph of FIG. 2. Furthermore, these 3 complex multiplications are all by the same complex number $W_8^2$ which is equal to j because $W_8^2 = e^{j2\pi \cdot 2/8} = e^{j\pi/2} = \cos(\pi/2) + j\sin(\pi/2) = j$. A complex number a+jb multiplied by j is equal to −b+ja, so that each of these 3 complex multiplications can be replaced by an exchange of the real and imaginary parts of the complex intermediate result and a change in the sign of the resulting real part. The flow graph of FIG. 3 thus provides for computation of the DFT in a manner that is very easy to implement.

For use in detecting signals having predetermined frequencies from a wider range of frequencies represented by all of the outputs of the DFT, for example for detecting SAT in a base station of a wireless communications system, it can be appreciated that only some of the DFT outputs corresponding to the predetermined frequencies may need to be calculated. In this case, the flow graph of FIG. 3 can be further simplified to provide only the desired, or partial, DFT outputs.

For example, if the outputs X(0), X(2), and X(6) represent the three possible SAT frequencies and the other outputs of the DFT represent other, non-SAT, frequencies, then a partial DFT computation can be performed to provide only these outputs. In the flow graph of FIG. 3 for an 8-point DFT, in this case the lower half of the first stage butterfly providing the intermediate result at location m14, all of the subsequent parts of the flow graph resulting in the outputs X(1), X(3), X(5), and X(7), and the lower half of the third stage butterfly which provides the output X(4), can be removed, with removal of the corresponding processing load and memory locations.

In practice, it has been found that an 8-point DFT is not sufficient for reliable SAT detection, and that a substantially larger (preferably integer power of two) size DFT is desirable in order to provide a desired frequency resolution. At the same time, the DFT can not be so large that it can not be computed using the DSP resources that are available, within the time limits imposed by the attack and release times required for SAT detection. In view of these and other practical considerations, a 32-point partial DFT represents a desirable size of DFT for SAT detection. The principles described above in relation to the flow graph of FIG. 3 can be applied to such a larger size partial DFT with particular advantage because of the reductions in processing load that are thereby achieved, in particular due to the reduced numbers of complex multiplications that are required in the computation of the DFT.

Figure 4:
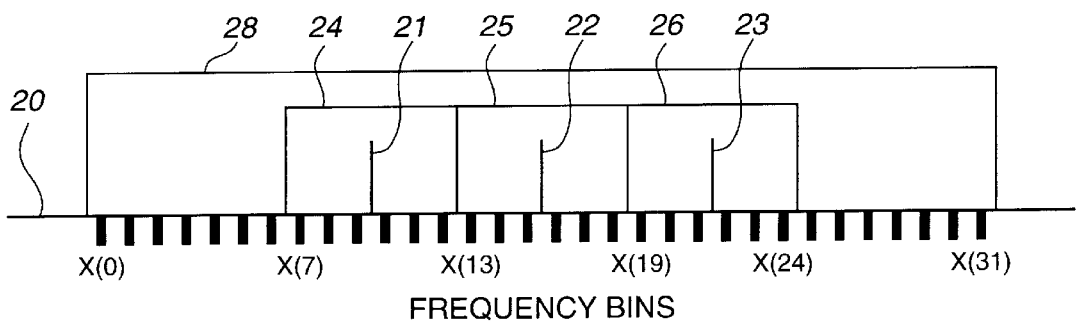
FIG. 4 illustrates SAT frequency decision regions and frequency bins of a 32-point DFT for use in detecting SAT in accordance with an embodiment of this invention.

FIG. 4 illustrates a frequency diagram in which a horizontal line 20 represents a baseband frequency axis and vertical lines 21 to 23 represent the three nominal SAT frequencies, spaced 30 Hz apart, each at the center of a respective one of three contiguous frequency decision regions 24 to 26 respectively. The regions 24 to 26 cover a total bandwidth of 90 Hz, which is centered within a 160 Hz bandwidth 28 defined by a low pass filter (LPF) described later below. A 32-point DFT is used to provide 32 frequency bins, represented by outputs X(0) to X(31) of the DFT, spanning this bandwidth 28, so that the frequency bins have a spacing of 5 Hz and 6 frequency bins correspond to the width of each of the SAT decision regions 24 to 26. As the DFT is used in this case only for SAT detection, and the DFT outputs X(0) to X(6) and X(25) to X(31) correspond to frequency bins outside the SAT detection regions 24 to 26, it is only necessary to compute the DFT outputs X(7) to X(24) to determine whether or not a valid SAT is present for each nominal SAT frequency 21 to 23. Thus a partial 32-point DFT providing only these outputs is sufficient for SAT detection.

Figure 5:
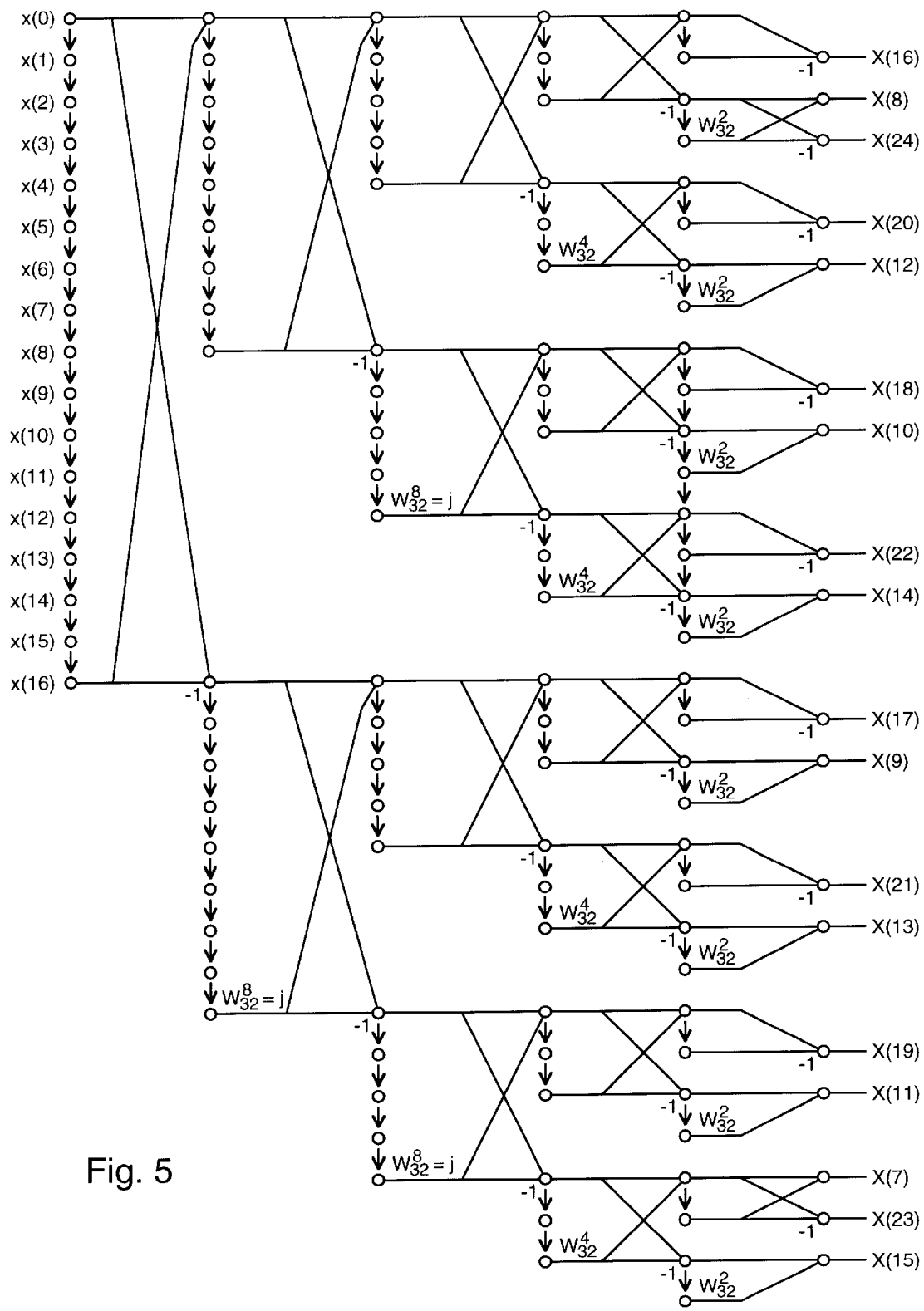
FIG. 5 is a flow graph for computing a 32-point partial DFT, for use in detecting SAT, in accordance with an embodiment of this invention.

FIG. 5 illustrates, in a similar manner to the illustration of FIG. 3, a flow graph for a 32-point partial DFT, in accordance with an embodiment of this invention, for providing the 18 outputs X(7) to X(24) as described above. In this case there are $M=\log_2(N)=5$ stages of butterfly computations, with half of the butterfly computation being absent in many instances in the fifth stage because the corresponding frequency bin outputs are not required. The flow graph uses the same characteristics as for FIG. 3 described in detail above, with circles denoting memory locations, downwardly-directed arrows denoting shifting of memory contents or pointers, and multiplications by $-1$, $W_{32}^8=j$, $W_{32}^4$, and $W_{32}^2$ where illustrated. The multiplications by $W_{32}^8=j$ are easily implemented by exchanging real and imaginary parts of the complex number and changing the sign of the resulting real part as described above. Complex multiplications are used for the multiplications by the complex numbers or coefficients $W_{32}^4$ and $W_{32}^2$.

Implementation in a DSP of the flow graph of FIG. 5 requires 12 complex multiplications and 48 complex additions, as well as memory locations for the two complex coefficients $W_{32}^4$ and $W_{32}^2$ and for the 129 complex numbers constituted by the 17 samples x(0) to x(16) of the input sequence, the 18, 20, 24, and 32 intermediate results at the output sides of stages 1, 2, 3, and 4 respectively, and the 18 frequency bin outputs X(7) to X(24) at the output of stage 5. This represents a very substantial reduction in DSP computing requirements, especially due to the low number of complex multiplications required, compared with conventional implementation of an equivalent partial 32-point DFT.

It can be appreciated that the particular flow graph of FIG. 5 constitutes only one of many possible flow graphs for implementing the same partial 32-point DFT which can be provided in accordance with embodiments of the invention. Other possible flow graphs can be arrived at using known alternatives such as different ordering of the inputs and/or outputs, and subdivision of the DFT using decimation-in-time rather than decimation-in-frequency principles. Such other possible flow graphs can result in different processing and storage requirements from those given above which relate specifically to the flow graph of FIG. 5.

Figure 6:
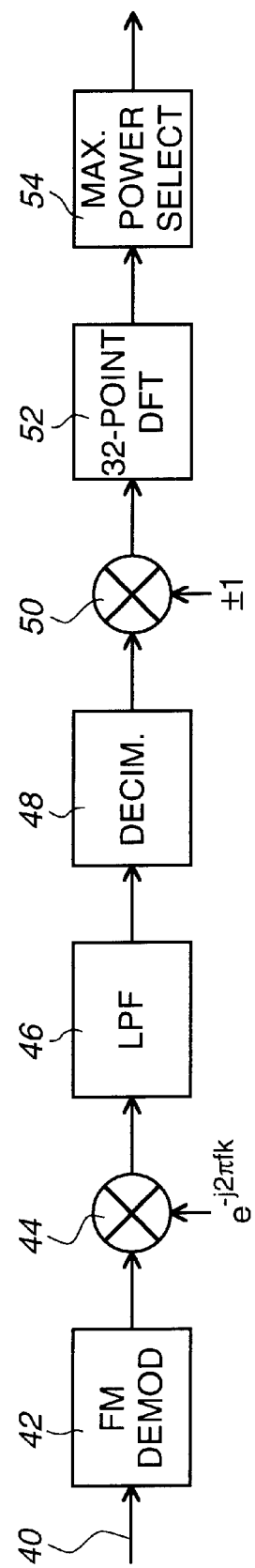
FIG. 6 illustrates a block diagram of parts of a base station receiver of a wireless communications system including a partial DFT computation in accordance with the flow graph of FIG. 5.

FIG. 6 illustrates parts of a base station receiver of a wireless communications system in which SAT detection is performed by a partial DFT computation in accordance with the flow graph of FIG. 5.

Referring to FIG. 6, a voice channel signal received by the base station from a mobile terminal is sampled at a sampling rate of for example 48.6 kHz, and the sampled signal is supplied via a line 40 to an FM demodulator 42. For SAT detection, the resulting demodulated sampled signal is multiplied in a complex multiplier 44 by a sampled signal $e^{-j2\pi fk}$, where f is the nominal center frequency of the SAT decision regions, i.e. 6 kHz, and k is a sample number. This translates the SAT frequency band to zero frequency, where it is separated from other components of the incoming signal by a low pass filter (LPF) 46. The LPF 46 for example has a pass band up to ±80 Hz, corresponding to the 160 Hz bandwidth 28 described above with reference to FIG. 4. The output of the LPF 46 is decimated by a decimator 48, which for example supplies to its output only 1 of every 303 samples supplied to its input to provide a down-sampling or decimation factor of 303, whereby the sample rate at the output of the decimator 48 is reduced from 48.6 kHz to about 160 Hz. The LPF bandwidth and down-sampled rate need not be related to one another and can be substantially different from these values, which are given here by way of example.

Alternate samples from the output of the decimator 48 are multiplied by plus and minus 1 by a multiplier 50 to translate the sample frequency band to zero to 160 Hz. The complex signal samples at the output of the multiplier 50 constitute the samples which are supplied to the input of a 32-point DFT 52, which implements the flow graph of FIG. 5 as described above. A maximum power selector 54 is responsive to the 18 frequency bin outputs X(7) to X(24) of the DFT 52 to determine which output has a maximum power (maximum$|X(p)|^2$ for p=7 to 24) and, if this exceeds a threshold level, that SAT is detected within the respective SAT frequency decision region and hence at the respective SAT frequency. As can be appreciated from FIG. 4 as described above, a maximum power above the threshold level for one of the outputs X(7) to X(12) corresponds to detection of SAT at a frequency of 5970 Hz, a maximum power above the threshold level for one of the outputs X(13) to X(18) corresponds to detection of SAT at a frequency of 6000 Hz, and a maximum power above the threshold level for one of the outputs X(19) to X(24) corresponds to detection of SAT at a frequency of 6030 Hz.

It can be appreciated that other methods can be used for SAT detection from the outputs of the DFT unit 52, and more generally for determining whether or not a signal component such as a tone is present for any frequency bin for which an output is provided from the DFT. In general, a DFT as described above can have one or more outputs for detecting one or more frequency components at the respective frequencies, and any desired method can be used to determine whether or not the particular output of the DFT indicates the presence of the respective frequency component in the signal represented by the sequence of samples supplied to the input of the DFT. As noted above, the form of the DFT described above is particularly useful, in comparison to known ways of computing the DFT, where the N-point DFT has more than $\log_2(N)$ outputs.

It can be seen from the specific embodiments of the invention described above with reference to FIGS. 3 and 5 that the principles of the invention can be considered generally when applied to power-of-two sizes of DFT, i.e. N-point DFTs where $N=2^M$ and M is an integer greater than 1, the DFT then having M stages of two-input and two-output butterfly computations each identified by an integer m from 1 to M from the inputs to the outputs. There may be N outputs for a full DFT, or a smaller number for a partial DFT, down to only a single output if only one frequency is of interest, but the invention is particularly applicable to cases in which the number of outputs, and corresponding frequencies of interest, is greater than $\log_2(N)$. Correspondingly, only those parts of the full DFT computation that are needed for the required outputs are provided.

For a full DFT with N outputs, each stage m provides $2^{m-1}$ butterfly computations to determine $2^m$ complex values, which in the case of the last stage m=M are the $N=2^M$ outputs and in the case of each of the stages from 1 to M−1 are $2^m$ intermediate results which are stored in respective memory locations as described above. Each of these stored determined intermediate results is used for a butterfly computation of the respective next stage after a delay of $2^{M-m-1}$ samples. Thus for example in FIG. 3 for which M=3 the determined intermediate result stored at location m10, for which m=1, is used for the butterfly computation in the next subsequent stage in respect of the location m12 which corresponds to a storage delay of $2^{M-m-1}=2^{3-1-1}=2$ samples, and the determined intermediate result at location m24, for which m=2, is used for the butterfly computation in the next subsequent stage in respect of the location m25 which corresponds to a storage delay of $2^{M-m-1}=2^{3-2-1}=1$ sample. A similar correlation can be seen from the flow graph of FIG. 5.

For a partial DFT with fewer than N outputs, the numbers of $2^{m-1}$ butterfly computations and $2^m$ determined complex values represent maxima, and smaller numbers (and halves of the butterfly computations to provide only one output) can be sufficient to provide the necessary determined values, as described above by way of example.

Although the computations of DFTs as described above use radix-2 butterfly computations having two inputs and two outputs, the invention is not necessarily limited in this respect and the principles of calculating, storing, and shifting stored intermediate results to provide the required inputs for successive butterfly computation stages can also be applied (with appropriate adjustments such as the shifting rate compared to the input sequence sample rate, and the number of locations through which each shift is effected) to other sizes of, for example radix-4, butterfly computation stages.

Thus although particular embodiments of the invention have been described in detail, it should be appreciated that these are provided by way of example and that numerous modifications, variations, and adaptations may be made without departing from the scope of the invention as defined in the claims. In particular, it is observed that the principles of the invention are applicable regardless of the purpose of the DFT computation and whether or not this relates to detection of one or more tones or predetermined frequencies, whether the computation is of a full or partial DFT, and regardless of the size of the DFT (and whether or not the size is an integer power of two as is preferred). In addition, a DFT in accordance with the invention can be used for tone detection purposes other than for SAT detection as described above.

What is claimed is:

1. A method of determining at least one frequency component of a sampled input signal using an N-point discrete Fourier transform (DFT), where $N=2^M$ and M is an integer greater than 1, the DFT comprising M stages of butterfly computations from at least one input for the successive samples of the input signal to a respective output for each frequency component, comprising the steps of:

providing each of said stages with up to $2^{m-1}$ butterfly computations where m is a number of the stage from 1 to M from said at least one input to said respective output(s);

determining said at least one frequency component at its respective output from the stage M; and for each of the stages from 1 to M−1:
  determining 1 to $2^m$ intermediate results using the respective butterfly computation(s) and storing the determined intermediate result(s); and
  deriving 1 to $2^m$ intermediate results required, in addition to the 1 to $2^m$ intermediate results determined in respect of a current sample of the input signal, for butterfly computation(s) in the next subsequent stage from the stored intermediate result(s) determined in respect of preceding sample(s) of the input signal.

2. A method as claimed in claim 1 wherein, for each of said stages from 1 to M−1, each derived intermediate result is constituted by a determined intermediate result stored in respect of a sample which is $2^{M-m-1}$ samples before a current sample of the input signal.

3. A method as claimed in claim 2 wherein more than $\log_2(N)$ frequency components are determined at respective outputs.

4. A method as claimed in claim 2 wherein N frequency components are determined at respective outputs.

5. A method as claimed in claim 1 and comprising the step of establishing presence or absence of the at least one predetermined frequency component by determining a power of a signal at the respective output of the DFT.

6. A method as claimed in claim 5 wherein the step of detecting presence or absence of the at least one predetermined frequency component comprises comparing a power of a signal at the respective output of the DFT with a threshold level.

7. A method as claimed in claim 5 and comprising the step of deriving the sample of the input signal from a received signal in a wireless communications system, wherein the at least one predetermined frequency component comprises a supervisory audio tone (SAT) of the system.

8. A method as claimed in claim 7 wherein the DFT has a plurality of outputs for respective frequencies within a frequency decision region for each of a plurality of SAT frequencies of the system.

9. A method as claimed in claim 7 and comprising the step of deriving the samples of the input signal from the received signal via a filter having a bandwidth which is greater than a total bandwidth of a plurality of SAT frequency divisions for frequencies in each of which the DFT provides a plurality of outputs.

10. A method as claimed in claim 7 and comprising the step of deriving the samples of the input signal from the received signal via a decimator.

11. A method of computing at least one output of a discrete Fourier transform (DFT) from input signal samples using a digital signal processor (DSP) providing a plurality of computation stages and storage locations for storing intermediate results between the stages, comprising the steps of:

for at least one of the stages, determining only a subset of the intermediate results required for computation by the next stage;

storing the determined subset of intermediate results in respective ones of said storage locations; and producing each other intermediate result required for computation by the next stage by shifting relative to the storage locations a respective stored intermediate result of said subset determined in respect of a preceding input signal sample.

12. A method as claimed in claim 11 wherein each of the stages comprises a butterfly computation stage having two inputs and at least one output.

13. A method as claimed in claim 12 wherein the DFT is an N-point DFT where $N=2^M$ and M is an integer greater than 1, there are M stages, each of the stages m from 1 to M−1 determines at most $2^m$ intermediate results in the respective subset for a current input signal sample, and each of up to $2^m$ other intermediate results required for computation by the next stage is produced by said shifting of a respective stored intermediate result of the respective subset determined in respect of an input signal sample preceding the current input signal sample by $2^{M-m-1}$ samples.

14. A method as claimed in claim 13 for computing at least $\log_2(N)$ outputs of the DFT.

15. A method as claimed in claim 13 for computing N outputs of the DFT.

16. A method of detecting at least one predetermined frequency component in a signal, comprising the steps of computing, for each predetermined frequency component, at least one respective output corresponding to said frequency component of a discrete Fourier transform (DFT) from input signal samples using a digital signal processor (DSP) providing a plurality of computation stages and storage locations for storing intermediate results between the stage, comprising the steps of:

for at least one of the stages, determining only a subset of the intermediate results required for computation by the next stage;

storing the determined subset of intermediate results in respective ones of said storage locations; and producing each other intermediate result required for computation by the next stage by shifting relative to the storage locations a respective stored intermediate result of said subset determined in respect of a preceding input signal sample;

the method further comprising the steps of supplying samples of said signal as the input signal samples to the DFT, and detecting presence or absence of the predetermined frequency component from the respective output of the DFT.

17. A method as claimed in claim 16 wherein the step of detecting presence or absence of the predetermined frequency component comprises determining a power of a signal at the respective output of the DFT.

18. A method as claimed in claim 16 wherein the step of detecting presence or absence of the predetermined frequency component comprises comparing a power of a signal at the respective output of the DFT with a threshold level.

19. A method as claimed in claim 16, and comprising the step of deriving the signal from a received signal in a wireless communications system, wherein the at least one predetermined frequency component comprises a supervisory audio tone (SAT) of the system.

20. A method as claimed in claim 19 wherein the DFT has a plurality of outputs for respective frequencies within a frequency decision region for each of a plurality of SAT frequencies of the system.

21. A method of detecting a frequency component in a signal, comprising the steps of:

supplying samples of the signal to at least one input of a discrete Fourier transform (DFT) having at least one output corresponding to said frequency component; and monitoring a signal at said at least one output of the DFT to detect said frequency component in the signal;

the DFT comprising a plurality of sequential computation stages between said at least one input and said at least one output of the DFT, and storage locations for storing intermediate results between successive stages;

wherein the DFT computes the signal at said at least one output using intermediate results, for at least one of the computation stages, which are a combination of intermediate results determined in respect of a current sample of the input signal and intermediate results which have been stored in the storage locations and have been determined in respect of a previous sample of the input signal.

22. A method as claimed in claim 21 wherein the signal at said at least one output is determined for each sample of the input signal.

23. A method as claimed in claim 21 and comprising the step of deriving the input signal from a received signal in a wireless communications system, wherein the frequency component comprises a supervisory audio tone (SAT) of the system.

24. A method as claimed in claim 23 wherein the DFT has a plurality of outputs corresponding to a plurality of frequencies within a respective frequency decision range for each of a plurality of SAT frequencies of the system.

25. A method of monitoring supervisory audio tone (SAT) in a received signal of a communications system, comprising the steps of:

deriving from the received signal a sequence of samples and supplying the samples to a discrete Fourier transform (DFT) unit comprising a plurality of successive computation stages and storage locations between the stages for storing intermediate results determined by one stage for use by the next stage;

for each sample supplied to the DFT unit, producing in said storage locations intermediate results which are a combination of intermediate results determined in respect of the current sample and intermediate results determined in respect of at least one preceding sample and stored in respective ones of said storage locations;

the DFT unit producing signals at respective outputs thereof corresponding to a plurality of SAT frequencies of the system; and monitoring the signals produced at said outputs of the DFT unit to determine the presence of SAT in the received signal at a respective SAT frequency.

26. A method as claimed in claim 25 wherein the step of monitoring the signals produced at said outputs of the DFT unit comprises determining powers of said signals.

27. A method as claimed in claim 26 wherein the step of monitoring the signals produced at said outputs of the DFT unit further comprises comparing a power of a maximum one of said signals with a threshold level.

28. A method as claimed in claim 25 wherein the step of deriving the sequence of samples from the received signal comprises the step of filtering a demodulated signal derived from the received signal to produce a filtered signal having a bandwidth greater than a frequency decision range for the SAT frequencies, the sequence of samples supplied to the DFT representing the filtered signal.

29. A method as claimed in claim 28 and including the step of decimating the filtered signal to produce the sequence of samples for supply to the DFT.

30. A method as claimed in claim 29 wherein the DFT unit computes an N-point DFT and provides n outputs corresponding to said frequency decision range, where N and n are integers and n<N, wherein said bandwidth corresponds to approximately N/n times said frequency decision range.

31. A method as claimed in claim 30 wherein $N=2^M$ where M is an integer greater than 1.

32. A method as claimed in claim 31 wherein n is greater than $\log_2(N)$.

33. A digital signal processor (DSP) programmed and arranged to carry out a method of computing at least one output of a discrete Fourier transform from input signal samples, the DSP providing a plurality of computation stages and storage locations for storing intermediate results between the stages, and the method comprising the steps of:

for at least one of the stages, determining only a subset of the intermediate results required for computation by the next stage;

storing the determined subset of intermediate results in respective ones of said storage locations; and producing each other intermediate result required for computation by the next stage by shifting relative to the storage locations a respective stored intermediate result of said subset determined in respect of a preceding input signal sample.

34. A discrete Fourier transform (DFT) unit comprising:

an input for successive samples of a sampled signal and at least one output corresponding to a frequency component of said signal;

a plurality of successive butterfly computation stages between said input and said at least one output, and storage locations for storing intermediate results between the stages, at least one of the stages being arranged to compute and provide to respective storage locations in respect of a current sample at said input only a subset of the intermediate results required by the respective next successive stage for computation in respect of the current sample at said input; and means for producing each other intermediate result, required by the respective next successive stage for computation in respect of the current sample at said input, by shifting relative to the storage locations a respective stored intermediate result of said subset computed in respect of a sample at said input preceding the current sample.

35. A DFT unit as claimed in claim 34 wherein each of the butterfly computation stages has two inputs and at least one output.

36. A DFT unit as claimed in claim 35 and having M stages for computing an N-point DFT where $N=2^M$ and M is an integer greater than 1, each of the stages m from 1 to M−1 is arranged to compute at most $2^m$ intermediate results in the respective subset for the current sample at said input, and each of up to $2^m$ other intermediate results, required by the respective next successive stage for computation in respect of the current sample at said input, is arranged to be produced by said shifting of a respective stored intermediate result of the respective subset computed in respect of a sample at said input preceding the current sample at said input by $2^{M-m-1}$ samples.

37. A DFT unit as claimed in claim 36 and having at least $\log_2(N)$ outputs.

38. Apparatus for detecting a tone in a received signal of a communications system, comprising a discrete Fourier transform (DFT) unit having an input and at least one output, and means for supplying to the input of the DFT samples of a signal derived from the received signal, the DFT unit further comprising:

a plurality of successive butterfly computation stages between said input and said at least one output, and storage locations for storing intermediate results between the stages, at least one of the stages being arranged to compute and provide to respective storage locations in respect of a current sample at said input only a subset of the intermediate results required by the respective next successive stage for computation in respect of the current sample at said input; and means for producing each other intermediate result, required by the respective next successive stage for computation in respect of the current sample at said input, by shifting relative to the storage locations a respective stored intermediate result of said subset computed in respect of a sample at said input preceding the current sample;

wherein the at least one output corresponds to a frequency of the tone and the apparatus further comprises means for monitoring a signal produced at said at least one output to detect said tone.

* * * * *